United States Patent
Ranganathan (10) Patent No.: US 7,366,921 B2
(45) Date of Patent: Apr. 29, 2008

(54) SELECTING INPUT/OUTPUT DEVICES TO CONTROL POWER CONSUMPTION OF A COMPUTER SYSTEM

(75) Inventor: Parthasarathy Ranganathan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 452 days.

(21) Appl. No.: 10/830,217

(22) Filed: Apr. 23, 2004

(65) Prior Publication Data

US 2005/0240786 A1   Oct. 27, 2005

(51) Int. Cl.
  *G06F 1/00*   (2006.01)
  *G06F 1/32*   (2006.01)

(52) U.S. Cl. .............. 713/300; 713/300; 713/320; 713/324; 713/340

(58) Field of Classification Search ............. 713/300, 713/320, 324, 340
See application file for complete search history.

(56) References Cited

U.S. PATENT DOCUMENTS

| | | | | |
|---|---|---|---|---|
| 5,167,024 A * | 11/1992 | Smith et al. | ............... | 713/322 |
| 5,483,656 A * | 1/1996 | Oprescu et al. | ............. | 713/320 |
| 5,546,591 A * | 8/1996 | Wurzburg et al. | ......... | 713/322 |
| 5,557,557 A * | 9/1996 | Frantz et al. | ............... | 703/22 |
| 5,655,126 A | 8/1997 | Glenning | | |
| 5,692,197 A * | 11/1997 | Narad et al. | ............... | 713/323 |
| 5,787,292 A * | 7/1998 | Ottesen et al. | ............. | 713/300 |
| 5,958,055 A * | 9/1999 | Evoy et al. | ................ | 713/310 |
| 5,964,879 A * | 10/1999 | Dunstan et al. | ............. | 713/340 |
| 6,289,399 B1 * | 9/2001 | Furuichi et al. | ............. | 710/6 |
| 6,418,535 B1 * | 7/2002 | Kulakowski et al. | ...... | 713/320 |
| 6,456,016 B1 | 9/2002 | Sundahl et al. | | |
| 6,501,999 B1 * | 12/2002 | Cai | ........................... | 700/82 |
| 6,532,149 B2 * | 3/2003 | Dhar et al. | ................ | 361/683 |
| 6,697,953 B1 | 2/2004 | Collins | | |
| 6,804,632 B2 * | 10/2004 | Orenstien et al. | .......... | 702/188 |
| 6,925,573 B2 * | 8/2005 | Bodas | ....................... | 713/320 |
| 7,017,061 B2 * | 3/2006 | Lippert et al. | .............. | 713/324 |
| 7,030,837 B1 * | 4/2006 | Vong et al. | ................. | 345/1.3 |
| 7,047,339 B2 * | 5/2006 | Oakley | ...................... | 710/303 |
| 7,134,029 B2 * | 11/2006 | Hepner et al. | .............. | 713/300 |
| 2003/0135288 A1 | 7/2003 | Ranganathan et al. | | |
| 2003/0147369 A1 * | 8/2003 | Singh et al. | ................ | 370/338 |
| 2003/0149904 A1 | 8/2003 | Kim | | |
| 2003/0156074 A1 | 8/2003 | Ranganathan et al. | | |
| 2005/0055590 A1 * | 3/2005 | Farkas et al. | ............... | 713/320 |
| 2005/0138442 A1 * | 6/2005 | Keller et al. | ................ | 713/300 |
| 2005/0210304 A1 * | 9/2005 | Hartung et al. | ............ | 713/320 |
| 2007/0067655 A1 * | 3/2007 | Shuster | ...................... | 713/300 |

OTHER PUBLICATIONS

Xiong, S. et al., "A Simple and Flexible Driver for OLED", ASID, 1999. Abstract.

Harter, T. et al., "Energy-Aware User Interfaces: An Evaluation of User Acceptance", Proceedings of the Annual Conference on Human Factors in Computing Systems, 2004; Dow nloaded from the Internet on Apr. 22, 2004.

(Continued)

*Primary Examiner*—Mark Connolly (57) ABSTRACT

Input/output (I/O) devices may be controlled to reduce power consumption of a computer system. A power consumption metric for the I/O devices connected to the computer system is determined. At least one of the I/O devices is selected based on the determined power consumption metric, and power consumption for the selected I/O device is reduced.

33 Claims, 5 Drawing Sheets

OTHER PUBLICATIONS

Harter, T. et al., "The Potential for Energy-Aware User Interfaces on Handheld Devices", Nov. 2003.

Iyer, S. et al., "Energy-Aware Display System Designs for Future Mobile Environments", ACM Press, 2003.

Kamijoh, N. et al., "Energy Trade-Offs in the IBM Wristwatch Computer", IBM Research Division, Oct. 2001. Abstract.

Pering, T. et al., "The Simulation and Evaluation of Dynamic Voltage Scaling Algorithms", ACM ISBN Aug. 2000.

Richardson, T. et al., "Virtual Network Computing", IEEE Internet Computing, Jan./Feb. 1998.

Udani, S. et al., "The Power Broker: Intelligent Power Management for Mobile Computer", Dept of Computer Information Science, University of Pennsylvania, 1996.

Viredaz, M. et al., "Energy Management on Handheld Devices", ACM Press, 2003.

Viredaz, M. et al., "Power Evaluation of a Handheld Computer", IEEE Micro, 2003.

eTForecasts, "Worldwide PDA & Smartphone Forecast 1998-2008", Jun. 2003.

Flinn, J. et al., "Energy-Aware Adaptation for Mobile Application", 1999.

Geelhoed, E. et al., "Energy-Aware User Interfaces and Energy-Adaptive Displays: Improving Battery Lifetimes in Mobile Devices", Proceedings of HP TechCon, Jun. 2004; Dow nloaded from the Internet on Apr. 22, 2004.

Bloom, L. et al., "Investigating the Relationship Between Battery Life and User Acceptance of Dynamic, Energy-Aware Interfaces on Handhelds", Hewlett Packard Technical Report, Dow nloaded from the Internet on Apr. 22, 2004.

Choi, I. et al., "Low-Pow er Color TFT LCD Display for Hand-Held Embedded Systems", Aug. 2002.

Draffan, E.A. et al., "Colour and Contrast Accessibility Issues: For the Design of E-Learning Materials", May 2003.

\* cited by examiner

SELECTING INPUT/OUTPUT DEVICES TO CONTROL POWER CONSUMPTION OF A COMPUTER SYSTEM

TECHNICAL FIELD

This invention relates generally to power management for computer systems. More particularly, the invention relates to controlling power consumption of a computer system through input and output devices.

BACKGROUND

Power management is an important function in several classes of computer systems. In particular, mobile computer systems, such as personal digital assistants (PDAs), laptops, cell phones, watch-computers, MP3 players, and other portable computer systems have limited capacity power supplies, such as batteries, that directly influence the usability and marketability of these computer systems. Using a larger capacity battery in these systems is often not feasible because of size and cost constraints and hence system-level power management is imperative for these devices.

Power management is also important for tethered computer systems, such as computer systems connected to an AC power source. Examples of tethered computer systems include personal desktop computers and servers. For these types of systems, the cost of electricity is a driving factor for power management. For example, ratings like EnergyStar in the United States and TopRunner in Japan encourage manufacturing and using energy efficient computer systems that are typically more environmentally friendly. Also, power supplies for computer systems tend to generate a significant portion of the amount of heat dissipated by these computer systems. By reducing power consumption, less costly cooling systems may be used with these computer systems. Also, a cooler running computer system may minimize system failures caused by thermal redlining.

Conventional computer system designs have traditionally viewed input and output (I/O) devices as human-computer interfaces that are optimized for maximizing user acceptance instead of maximizing for energy conservation. For example, a system designer of a PDA may provide a user with a choice of using a keyboard, a speech recognition interface or a handwriting recognition interface. Then the user, typically based on the user's personal preference, chooses between these various I/O devices without considering the power consumption of a selected I/O device, which can impact the available battery life of the PDA.

SUMMARY OF THE EMBODIMENTS

According to an embodiment, at least one I/O device connected to a computer system is selected based on a power metric. Power consumption for the selected I/O device is reduced, for example, to minimize power consumption of the computer system.

According to another embodiment, a power model and a usage model are used to select one or more I/O devices to reduce power consumption of a computer system.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

For simplicity and illustrative purposes, the principles of the embodiments are described. Moreover, in the following detailed description, references are made to the accompanying figures, which illustrate specific embodiments. Electrical, mechanical, logical and structural changes may be made to the embodiments without departing from the spirit and scope of the embodiments of the invention.

While the embodiments of the invention are applicable to a variety of computer systems, many of the embodiments are described with respect to a mobile computer system, such as a laptop or PDA, by way of illustration and not limitation. Also, power and energy management are used interchangeably.

According to an embodiment, an energy-aware I/O device control system is used to control I/O devices based on power conservation. The I/O device control system may control one or more I/O devices to reduce power consumption of a computer system when needed, such as when remaining battery life is low. Controlling an I/O device for a computer system may include reducing the power consumption of the I/O device to reduce the power consumption of the computer system. Power consumption as used herein can include specific power metrics such as average power or peak power or broader power metrics such as power multiplied by execution time (e.g., energy).

An example of the embodiment may include a gaming program utilizing a speech recognition interface as an input device, but when remaining battery life for the computer system is low, the I/O device control system may switch to a more power-efficient input device, such as a keyboard. Similarly, based on a predetermined power-setting mode selected by a user, an email application may provide email notification through a blinking LED instead of through a screen-based window notification. In another example, a software application may "soft-wire" various keyboard buttons to activate commonly-used functions to replace a more elaborate menu and touch-screen based interface. Thus, based on the power implications of various system component usages, the I/O device control system selectively controls I/O devices to minimize power consumption.

As used herein, an I/O device is a piece of hardware, which may be used in combination with software for providing data to a computer system and/or for receiving data from a computer system. Some I/O devices, such as a keyboard, a joystick, a mouse, and a touch pad, are used primarily for inputting data and are also called input devices. Other devices, such as a printer and a display, are used primarily for outputting data and are also called output devices. Also, in addition to a device interacting with the user, such as a joystick, mouse, or keyboard, the I/O device may include controllers, ASICS, drivers, etc.

A typical laptop, for example, may utilize several I/O devices. A laptop may use a keyboard, mouse, or touch pad for inputting data. Speech recognition software and hardware and/or handwriting recognition software may also be used as I/O devices. Even accelerometers that detect motion and associate them with a suitable action may be used. Similarly, I/O devices for outputting data may include a display panel on which information is visually displayed, small lights that blink to indicate a certain kind of information, audio systems that beep in response to certain actions, or more complex hardware/software modules that produce synthesized speech. The input and output may be associated with system components within the computer system, such as an integrated display and touch pad in a laptop, or may sometimes be associated with driving a set of pins that in turn drive an external device, such as a VGA connector on a laptop that drives a projector. Instead of driving pins, the communication can also be through wireless protocols such as Bluetooth, 802.11, etc.

Figure 1:
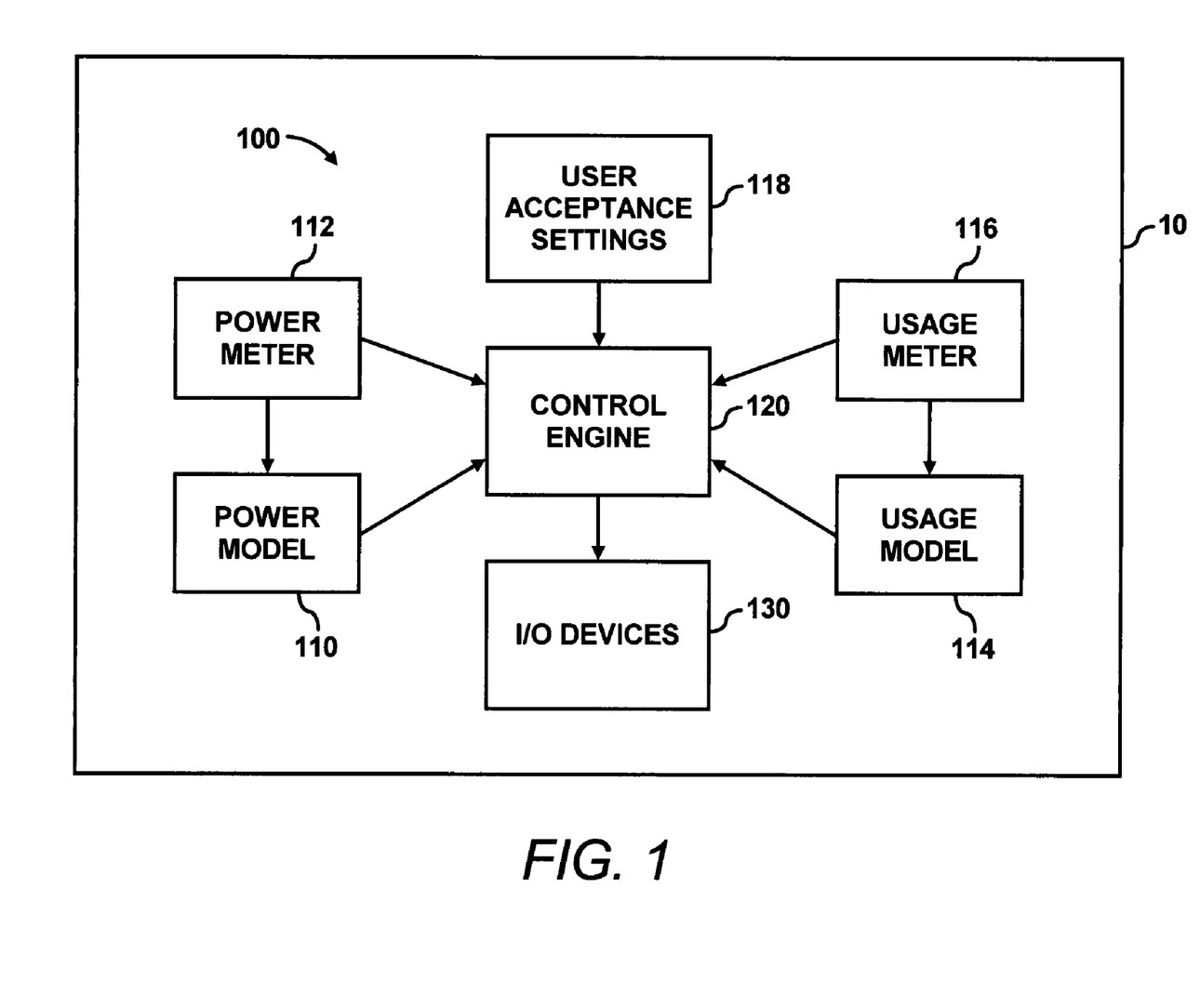
FIG. 1 illustrates an energy-aware control system, according to an embodiment.

FIG. 1 illustrates an embodiment of the energy-aware I/O device control system 100 implemented in a computer system 10. The I/O device control system 100 includes a power model 110, a power meter 112, a usage model 114, a usage meter 116, user acceptance settings 118 and a control engine 120. The I/O device control system 100 may be implemented in hardware, software or a combination thereof as would readily be implemented by one of ordinary skill in the art. For example, the control engine 120 and/or other components of the I/O device control system 100 may be implemented in software at the operating system level or windowing environment level that controls the I/O devices 130. Alternate embodiments implement the I/O device control system 100 in hardware or at the firmware or application layers.

The power model 110 can be used to determine a power consumption metric for the I/O devices 130. The power consumption metric is a metric associated with the power consumption of the I/O devices 130, such as an estimate of the power consumptions of the I/O devices 130 and/or an estimate of the future power consumptions of the I/O devices 130. Other power consumption metrics may be associated with power savings associated with placing an I/O device of the plurality of I/O devices in a low-power mode. As examples, the power consumption metric may include at least one of estimated power consumption of the I/O devices 130, estimated future power consumption of the I/O devices 130, an aggregate of the power consumption of each of the I/O devices 130, power consumption of the computer system 10, estimated future power consumption of the computer system 10, and a power savings for each of the I/O devices 130 if a respective I/O device were placed in a low-power mode. The determined power consumption metrics are used by the control engine 120, along with the output of other components of the I/O device control system 100, to select and/or control an I/O device based on power consumption of the computer system 10.

The power model 110 may be generated by profiling power consumption of the I/O devices 130 or similar I/O devices. Power consumption data, which may include power consumption measurements, can be captured over a period of time for the I/O devices 130. The power consumption data, for example, can be obtained during a study of the power consumption and use of I/O devices in a computer system. Also, the power meter 112 may measure power consumption for the I/O devices 130, which may be included in the power consumption data. The power consumption data can be used to generate the power model 110. A statistical analysis is performed on the power consumption data for the I/O devices 130 to estimate power consumption. Estimated power consumption may include an estimate of future power consumption for the I/O devices 130.

When applicable, the power model 110 also estimates the power consumption of various modes of operation for the I/O devices 130. Thus, the power model 110 may include the I/O devices 130 connected to the computer system 10 and available to the user, the mode of operation for each I/O device when applicable and the estimated power consumption for each I/O device, which may be specified for each mode of operation. For example, a speech recognition input device may have two modes of operation. In a first mode, a larger dictionary is utilized by the speech recognition input device, and in a second low-power mode, a smaller dictionary is utilized. The power model 110 includes the power consumption of the speech recognition input device in both modes of operation. Different modes of operation for an input device can be created based on other properties of the system. For example, a keyboard may be connected to a computer system through multiple types of wireless links, such as Bluetooth link or an 802.11 link. If these links have different power consumptions, then the power model 110 may include power consumption for each link. In another example, a touch screen may have different power consumptions based on the individual resistive properties of portions of the screen. Also, a display may have different power consumptions based on the color of the image being displayed.

The power model 110 may include a table or a similar data structure that includes estimated power consumptions of the I/O devices 130. For example, power consumption data including power consumption histories for each of the I/O devices in their various operating modes may be used to estimate future power consumptions of the I/O devices 130. The power consumption histories may include current power measurements performed by the power meter 1112. Estimations of future power consumption may include estimating the use of the I/O devices 130 for the applications currently running, and calculating the power consumption for the I/O devices 130 based on their estimated use for a predetermined period of time in the future. Known statistical analysis techniques, such as averaging, weighted averaging, use of histograms, etc., may be used to generate the values for a table. Also, various modeling algorithms may be used by the power model 110 to generate estimated power consumptions.

Table 1 provided below discloses an example of estimated power consumptions that may be generated by the power model 110. The first two columns identify a mode of operation for an I/O device and the last column specifies the estimated power consumption for the respective mode of operation. Other items of information may be added to table 1 as needed. For example, power consumption for a third mode of operation for an I/O device may be added.

TABLE 1

| I/O Device Mode 1 | I/O Device Mode 2 | Estimated Power Consumption (mW) |
| --- | --- | --- |
| Speech Recognition with Large Dictionary | | 500 |

TABLE 1-continued

| I/O Device Mode 1 | I/O Device Mode 2 | Estimated Power Consumption (mW) |
|---|---|---|
| | Speech Recognition with Small Dictionary | 400 |
| Button Input on Keyboard | | 10 |
| Touch Screen | | 400 |
| Handwriting Recognition | | 500 |

The usage model 114 can be used to determine a usage metric for the I/O devices 130, such as the amount of use of an I/O device, user preference for an I/O device, acceptable low-power alternatives to using an I/O device, etc. By profiling the use of the I/O devices 130 or similar I/O devices, the usage model 114 captures the typical usage behavior of the I/O devices 130, and the usage behaviors are evaluated to identify usage patterns of an I/O device. From the usage patterns, the content and intent of the use of an I/O device may be determined. The usage model 114 includes a historical analysis of the use of the I/O devices 130. The usage model 114 can be used to categorize the inefficiencies of the historical use of the I/O devices 130 and to provide alternatives to using a particular I/O device. The historical analysis can examine the use of an I/O device by a particular user, by a class of users, and/or by general use not categorized by class. The historical analysis may include an analysis of the I/O device captured offline, such as during a study of the use of the I/O device, and/or online, such as the use of the I/O by a particular user of the computer system 10.

The output of the usage model 114 may include the estimated use of an I/O devices 10 and possible low-power alternatives to using the I/O device. A low-power alternative to an I/O device, for example, can include another I/O device that consumes less power and performs substantially the same function and/or placing the I/O device in a low-power mode. For example, the usage model 114 may include a historical analysis of the use of a speech recognition I/O device. The analysis may indicate that the speech recognition I/O device is primarily used for a few short but commonly used commands that can be input via a keyboard. When battery power is low, the control engine 120 may disable the speech recognition I/O device and the user may use a keyboard to input the commands, which consumes less power than the speech recognition I/O device. Also, "soft-wired" buttons on the keyboard may be programmed to execute the commands.

In another example, the usage model 114 estimates the use of a display I/O device. For example, usage patterns of the display may be analyzed over a period of time for a plurality of users. The output of the usage model 114 may include a table summarizing usage patterns, such as the average sizes of windows utilized by a user of the display or a histogram of colors used by a typical user. Based on the output of the usage model 114, the control engine 120 may dim the windows on the display that are not primarily being used to minimize power consumption. Thus, the output of the usage model 114 can be analyzed to yield insights on users behaviors with respect to the I/O devices 130. Based on these insights, one or more of the I/O devices 130 may be placed in a low-power mode by the control engine 120 to control power consumption.

The power meter 112 measures the power consumption of the computer system 10. The power meter 112 may also estimate remaining battery life based on power consumption measurements if the computer system 10 is powered by a battery. Known battery lifetime estimation techniques may be used. The power meter 112 may also be used to measure or estimate the power consumption of the I/O devices 130. For example, the power meter 112 may measure current and voltage to determine power consumption of the computer system 10 and/or the I/O devices 130. The power metering can be performed at the overall computer system level or at the individual subcomponent level.

The output of the power meter 112, which may include measured power consumptions for the I/O devices 130 and estimated remaining battery life, is provided to the control engine 120. The control engine 120 uses this information, along with information from the other components of the I/O device control system 100 to control the I/O devices 130 to conserve power. The output of the power meter 112 may also be provided to the power model 110 to be used as power consumption data for estimating power consumption of the I/O devices 130.

The usage meter 116 captures the current usage of the I/O devices 130 by individual users during periods of time and predicts how the usage pattern is likely to change. For example, the usage meter 116 stores the number and types of input commands received from a speech recognition I/O device. Also, the usage meter 116 may store the length of time a window on a display is being used. The output of the usage meter 116 may be provided to the usage model 114 and the control engine 120. For example, the usage model 114 may determine that the speech recognition I/O device is primarily being used for short input commands that are used most often. Regarding the monitoring of the display, the usage model 114 may determine the length of time a particular window is being used and the position of the window on the display from data captured by the usage meter 116. Also, the control engine 120 may utilize the output of the usage meter 116 to determine which I/O device to control to minimize power consumption.

Another component of the I/O device control system 100 is the user acceptance settings 118. These are settings, which are typically determined by a user, for the I/O devices 130 that are acceptable to the user. For example, the control engine 120 may determine that disabling the speech recognition I/O device minimizes power consumption, and that other input options are available to the user. However, if the user acceptance settings indicate that the speech recognition I/O device may not be disabled, the control engine 120 controls other I/O devices to reduce power consumption.

The control engine 120 matches the I/O device needs of the user to the available options for the I/O devices 130 based on power consumption. The control engine 120 uses information from one or more of the power model 110, the usage model 114, the power meter 112, the usage meter 116 and the user acceptance settings 118 to implement energy-aware control of the I/O devices 130. For example, the control engine 120 assesses the current power consumption of the computer system 10, which includes the power consumption of the I/O devices 130, and the predicted future power consumption of the computer system 10, which may be based on the use of the I/O devices 130 for applications running on the computer system 10 for a predetermined period of time in the future. To implement the energy-aware control of an I/O device, the control engine 120 considers the current use of the I/O devices 130, such as determined by the usage meter 116, and the user acceptance settings 118. Using the power model 110, the usage model 114 and the power meter 112, the control engine 120 calculates a histogram of the top power consuming I/O devices and estimated power consumptions of these I/O devices for a period of time in the future. The control engine 120 may select one or more of the top power consuming I/O devices to control. This may include running an I/O device in a low-power mode instead of a normal mode. The low-power mode may include temporarily disabling the I/O device or running the I/O device with reduced functionality.

Figure 2A:
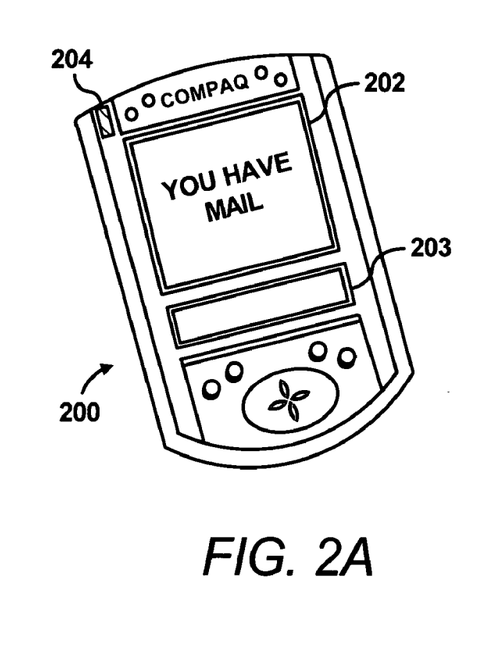
FIGS. 2A-C illustrate examples of using the energy-aware control system to control I/O devices for a computer system.
Figure 2B:
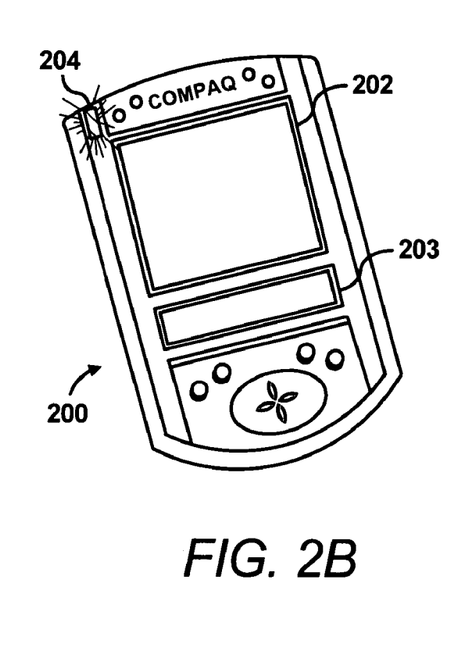
Figure 2C:
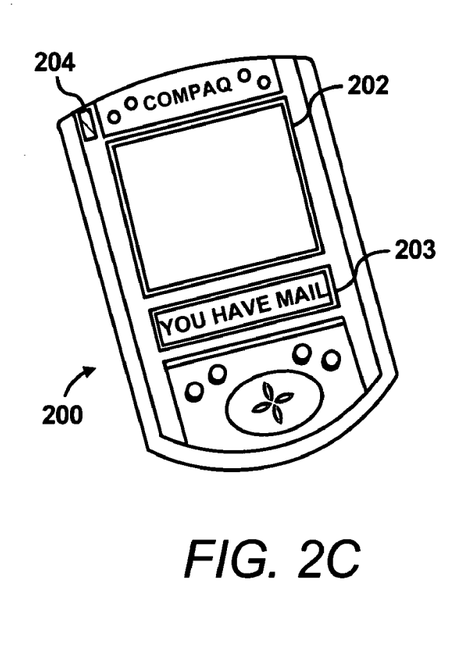

FIGS. 2A-C illustrate examples of providing energy-aware control of the I/O devices for a PDA 200. FIGS. 2A-C illustrate the PDA 200 with several displays 202-204. In FIG. 2A, email notification is provided on the display 202, which is the largest display of the displays 202-204 and which consumes the most amount of power. The control system 100, shown in FIG. 1, is implemented in the PDA 200 using software, hardware or a combination thereof.

The control engine 120 assesses the current power consumption of the PDA 200 and the predicted future power consumption of the PDA 200 using the power meter 112 to determine whether to implement energy-aware control of the I/O devices. For example, the control engine 120 determines that the predicted future power consumption exceeds the remaining battery life. The control engine 120 then identifies the top power consuming I/O devices of the PDA 200 from the power model 110. For example, the control engine 120 determines that the display 202 and a speech recognition I/O device (not shown) consume the most amount of power. Based on the output of the usage model 114, the control engine 120 determines that the speech recognition I/O device is used primarily for inputting short commands and other I/O devices which consume less power may be used to input the same commands. However, the user acceptance settings 118 in the control system 100 shown in FIG. 1 require the speech recognition I/O device to be fully functional. Thus, the control engine 120 controls the displays 202-204. For example, the usage model 114 shown in FIG. 1 determines that email notification may be provided on any of the displays 202-204. Thus, the control engine 120 directs email notification to a display that consumes less power, such as the display 204 shown in FIG. 2B including an LED.

FIG. 2C illustrates an example of providing email notification in the display 203. For example, assume the user settings 118 require that email notification be provided on the display 202 or the display 203. The control engine 120 selects the display 203 because it consumes less power.

Figure 3:
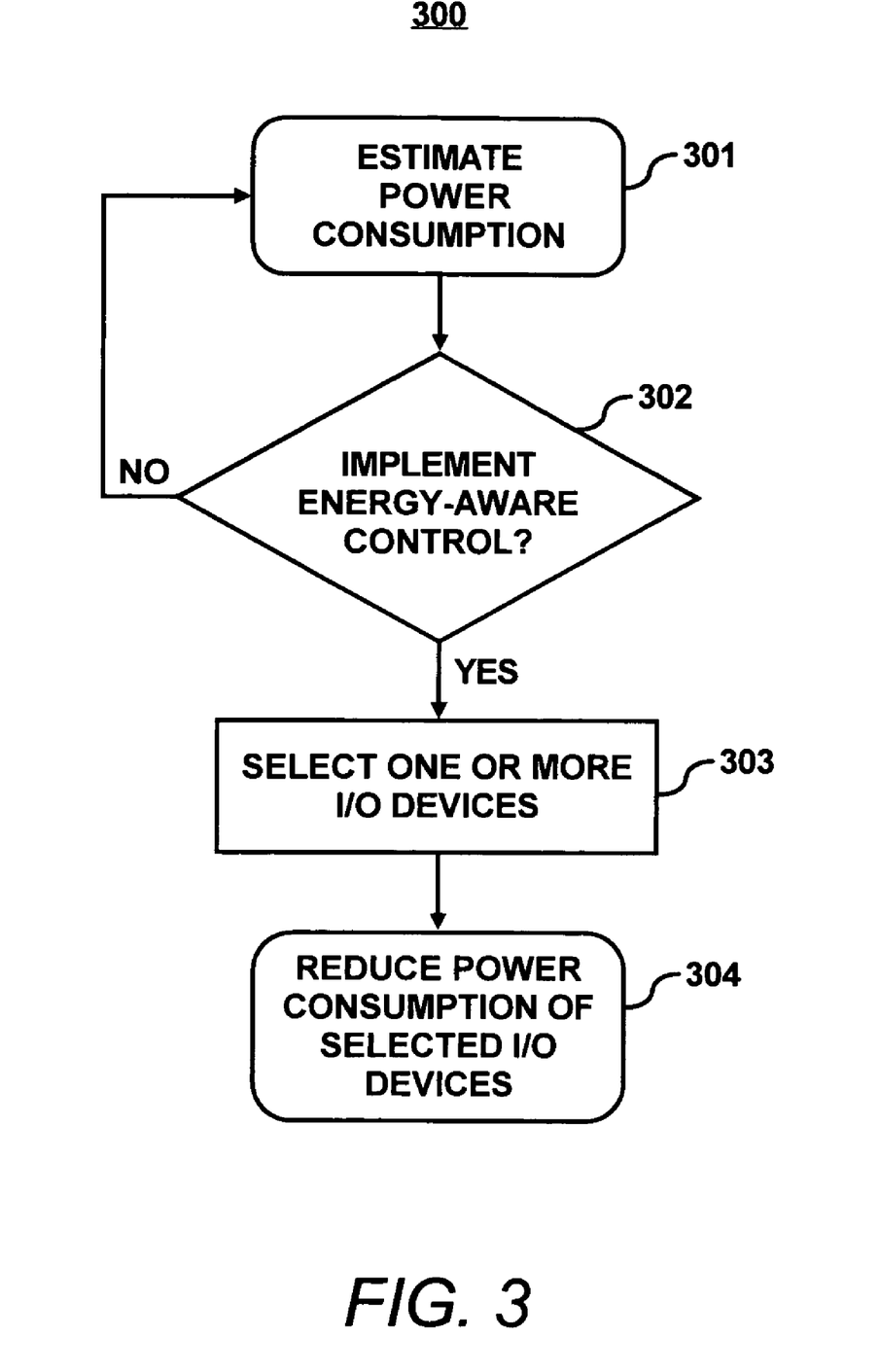
FIG. 3 illustrates a flow chart of a method for reducing power consumption of a computer system by controlling one or more I/O devices, according to an embodiment.

FIG. 3 illustrates a flow chart of a method 300 for providing energy-aware control of I/O devices according to an embodiment. FIG. 3 is described with respect to the I/O device control system 100 shown in FIG. 1 by way of example and not limitation. At step 301, the control engine 120 estimates power consumption for the computer system 10, which may include estimating future power consumption of the computer system 10. The power meter 112 measures the power consumption of the computer system 10, including the I/O devices 130. Based on the measured power consumption and the estimated continued use of the computer system 10, the control engine 120 estimates the future power consumption of the computer system 10. An estimate of future power consumption may include an estimate of how much battery life the user needs to continue operating the computer system 10 as desired by the user. The estimate may consider recent power consumption measurements and the rate of power consumption of the computer system 10. Also, the length of time the user needs to continue to operate the computer system 10, which can be input by the user, may be considered. The power meter 112 may output the measured power consumption as well as estimated future power consumption of the computer system 10. Alternatively, the estimated future power consumption may be calculated by the control engine 120.

At step 302, the control engine 120 determines whether to implement energy-aware control of the I/O devices 130. For example, if the power consumption or the estimated future power consumption of the computer system 10 exceeds a threshold, then the control engine 120 implements the energy-aware control of the I/O devices 130. The threshold may be based on the remaining battery life. For example, the threshold may be a remaining battery life of 30% of full capacity. Then, if the remaining battery life is less than or equal to 30%, the energy-aware control of the I/O devices 130 is performed. In another example, if the estimated future power consumption of the computer system 10 exceeds the remaining battery life or is within a predetermined amount of the remaining battery life, then the energy-aware control of the I/O devices 130 is performed. It will be apparent to one of ordinary skill in the art that other thresholds may be set based on the desired sensitivity of the system.

At step 303, the control engine 120 selects one or more of the I/O devices 130 for controlling power consumption of the computer system 10 if energy-aware control of the I/O devices 130 is implemented. The selection of one or more of the I/O devices to be controlled for reducing power consumption of the computer system 10 may be based on one or more power metrics and usage metrics of the I/O devices 130. The selection may include determining which of the I/O devices can be placed in a low-power mode, determining the power reduction implications of placing an I/O device in a low-power mode, and determining the non-power related implications of placing an I/O device in a low-power mode. For example, the control engine 120 evaluates the output of the power model 110 and/or the usage model 114 to identify top power consuming I/O devices that can be placed in a low-power mode to minimize power consumption. The control engine 120 may also evaluate non-power related factors, such as maintaining the user acceptance settings 118, determining the user acceptability of placing an I/O device in a low-power mode, determining whether another I/O device is operable to perform the functions of a disabled I/O device, etc. Examples of steps for selecting one or more I/O devices are described in detail below with respect to the method 400 shown in FIG. 4.

At step 304, the control engine 120 controls the I/O devices selected at the step 303 to reduce power consumption of the computer system 10. For example, the control engine 120 may place an I/O device in a low-power mode. This can include disabling an I/O device if, for example, other similar I/O options are available. This may also include placing an I/O device in a functional low-power mode, such as dimming a display or a portion of a display. If the control engine 120 is implemented in software, the control engine 120 reduces power consumption of an I/O device, for example, by instructing a controller to place the I/O device in a low-power mode. In another example, the control engine 120 may reduce power consumption of the computer system 10 by placing an I/O device in a high-power or normal power mode if the I/O device is used for a short period of time when compared to using the same I/O device in a low-power mode for a substantially longer period of time. For example, referring to FIG. 2A, email notification may be provided for a short period of time on the large display 202 or may be provided on the display 203 for a longer period of time, such as continuously until the email is read. Displaying the notification on the display 202, which consumes more power than the display 203, may result in overall less power consumption because the notification is displayed on the display 202 for a short period of time. Thus, a low-power alternative may include placing an I/O device in a high power or normal power mode.

Figure 4:
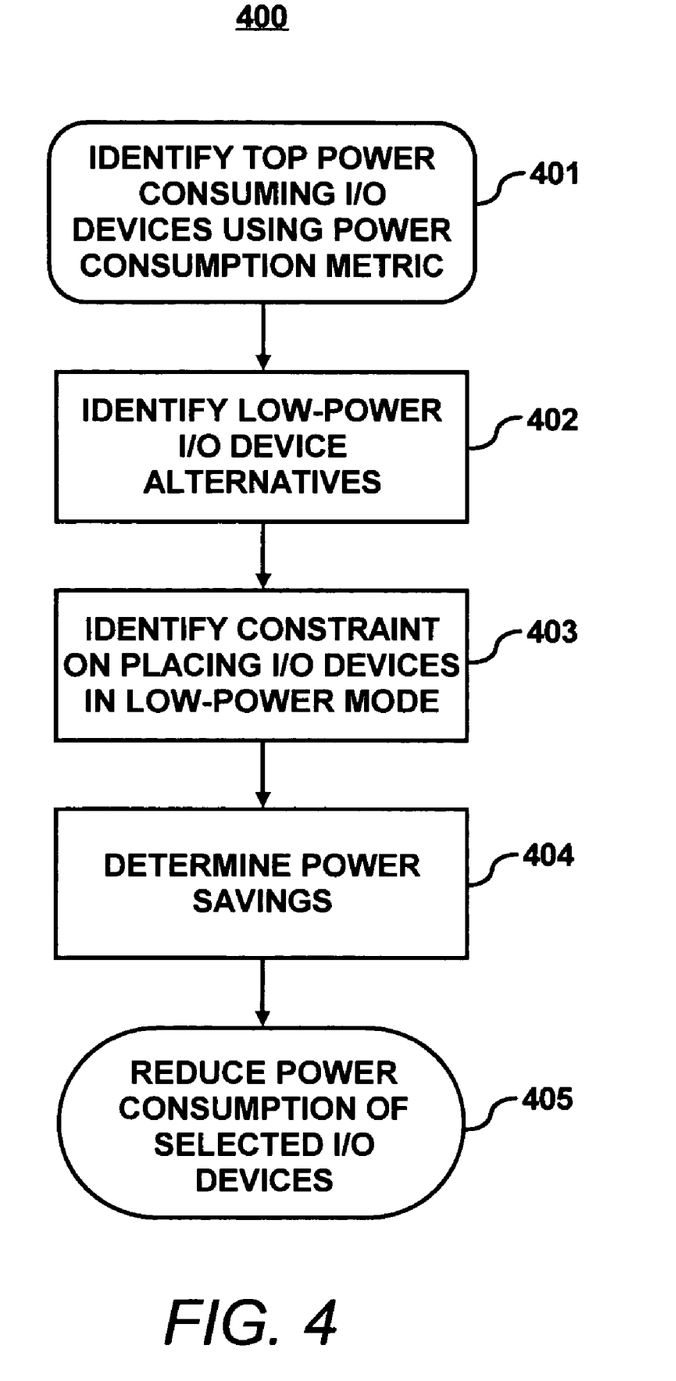
FIG. 4 illustrates a flow chart of a method for selecting one or more I/O devices to control for reducing power consumption.

FIG. 4 illustrates a flow chart of a method 400 for selecting one or more I/O devices that can be controlled to reduce power consumption of the computer system 10, according to an embodiment. The steps of the method 400 are steps that may be performed for selecting one or more of the I/O devices 130 to control power consumption of the computer system 10, such as described for the step 303 of the method 300. At step 401, the control engine 120 identifies the top power consuming I/O devices based on a power consumption metric for the I/O devices 130. The top power consuming devices are one or more of the I/O devices 130 determined to consume the most amount of power in the computer system 10. For example, using statistical analysis of power consumption data for each of the I/O devices 130, the control engine 120 identifies top power consuming I/O devices. The power consumption data may include power consumption measurements captured over a period of time for the I/O devices 130. Also, the power meter 112 may measure power consumption for the I/O devices 130, which may be included in the power consumption data.

In one example, the top power consuming I/O devices are determined by estimating future power consumption of the I/O devices based on the current use of the I/O devices. For example, a statistical analysis of the power consumption data may include using the power model 110 to calculate a first histogram of power consumption for each of the I/O devices 130. Then, a prediction histogram of estimated future power consumption of each of the I/O devices 130 is calculated. The prediction histogram is based on continued use of the I/O devices for a continued period of time into the future. The top power consuming I/O devices may be selected using the prediction histograms for each of the I/O devices.

Instead of performing a statistical analysis on power consumption data for each of the I/O devices 30, the usage meter 116 can be used to select a set of the I/O devices 130 that have been used over a period of time. Then, the statistical analysis is performed for each of the I/O devices in the set. Thus, the I/O devices determined to have a greater frequency of use and consuming the most amount of power become candidates for power consumption reduction. Also, a histogram is one example of a statistical analysis that can be performed on the power consumption data. Other types of analysis, such as averaging, weighted averaging, bar graphs, etc., may be used to evaluate power consumption data for the I/O devices 130.

At steps 402-405, the control engine 120 determines which top power consuming I/O devices to control for reducing power consumption. At step 402, the control engine 120 identifies low-power alternatives for the top power consuming I/O devices. A low-power alternative to an I/O device can include another I/O device that consumes less power and performs substantially the same function and/or placing the I/O device in a low-power mode.

The usage model 114 may be used to determine whether any low-power alternatives are available. This may include determining whether an I/O device can be placed in a low-power mode and the non-power related implications of placing an I/O device in a low-power mode. For example, assume the display is a top power consuming I/O device. The usage model 114 evaluates whether any low-power alternatives are available for the display. For example, the usage model 114 may include a historical analysis of the use of the display. The usage model 114 determines that a central portion of the display is primarily being used by the user and that the remaining portions of the display are idle. U.S. patent application Ser. No. 10/033,738, entitled "Software-Directed Energy-Aware Control Of Display" by Ranganathan et al., which is incorporated by reference in its entirety, discloses conducting an analysis of the usage of a display to determine an area of focus. The data from this analysis can be used by the usage model 114 to identify low-power modes for the display.

Based on a historical analysis of usage data, the usage model 114 may determine that the display can be placed in a low-power mode where the unused portions of the display are dimmed. The usage model 114 may also consider the user's acceptance of this low-power mode. For example, an analysis of the use of the display by the particular user may indicate that the user periodically turns off this low-power mode immediately after being activated, and thus the user does not particularly approve of this low-power mode. Then, at least one other low-power mode of the display, if available, may be selected by the control engine 120, and these low-power modes are eventually ranked based in part on user acceptance.

The output of the power model 110 may also be used to identify low-power modes for the top power consuming I/O devices. For example, the power model 110 may indicate the power consumption in each mode of operation for the I/O devices 130, and thus can be used to determine whether a low-power mode is available for an I/O device. A low-power mode may include a mode of operation for an I/O device where less power is consumed by the I/O device when compared to the I/O device operating in a normal mode. The low-power mode, for example, may include disabling the I/O device when another I/O device can provide the same functionality or may include providing reduced functionality in the low-power mode. For example, a display may include a low-power mode where background windows are dimmed. Also, a speech recognition I/O device may be disabled if the same commands can be input via a keyboard. The top power consuming I/O devices that can be placed in a low-power mode become candidates for I/O devices that are controlled to reduce power consumption.

At step 403, the control engine 120 determines whether any of the user settings 118 place constraints on placing an I/O device in a low-power mode. For example, the user settings 118 may require that the display not be placed in a low-power mode based on a user's preference. Then, the display is not selected as an I/O device that can be controlled to reduce power consumption. Thus, the user settings 118 may minimize the number of top-power consuming, I/O device, candidates that can be controlled to reduce power consumption.

At step 404, the control engine 120 determines the power implications of placing the top power consuming I/O devices in a low-power mode. For example, the control engine 120 calculates the power savings for each of the I/O devices selected at step 304. As described above, the power model 110 may estimate the future power consumption of the I/O devices 130 operating in different modes, such as a normal mode and one or more low-power modes. In one example, the control engine 120 compares estimated future power consumption for an I/O device operating in a low-power mode and an estimated future power consumption for the I/O device operating in a normal mode to determine power savings. The power savings may be calculated for each of the top power consuming I/O devices that can be placed in a low-power mode.

At step 405, the control engine 120 uses an objective function that considers the power-related and non-power-related implications of placing the top power consuming I/O devices in a low-power mode, such as described with respect to steps 403 and 404, for selecting one or more of the top power consuming devices to place in a low-power mode. The objective function may weight the different metrics, such as power savings, user acceptance, etc., to rank the top power consuming I/O devices. Then, one or more of the highest ranked, power consuming, I/O devices are selected to be placed in a low-power mode.

The steps 402-405 may be repeated to yield the best results. For example, the highest ranked I/O device determined at step 405 is a joystick that is to be operated in a low-power mode with reduced functionality. However, the low-power mode of the joystick is inoperable due to a malfunction. Thus, the steps 402-405 may be repeated to identify another I/O device to be placed in a low-power mode. Alternatively, another highly ranked I/O device may be selected to be placed in a low-power mode.

It will be readily apparent to one of ordinary skill in the art that modifications to the methods 300 and 400 may be made without departing from the spirit and scope of the embodiments. For example, in the method 400 the step 401 may not be performed and the step 402 of identifying low-power alternatives may be performed for recently used I/O devices or a group of I/O devices selected randomly or based on another metric. The usage model 114 may be used to identify a group of I/O devices that can be controlled to reduce power consumption and the power model 110 can be used to select one or more I/O devices in the group that can be used optimize power reduction. Also, one or more of the steps of the method 400 may be performed in different orders.

Figure 5:
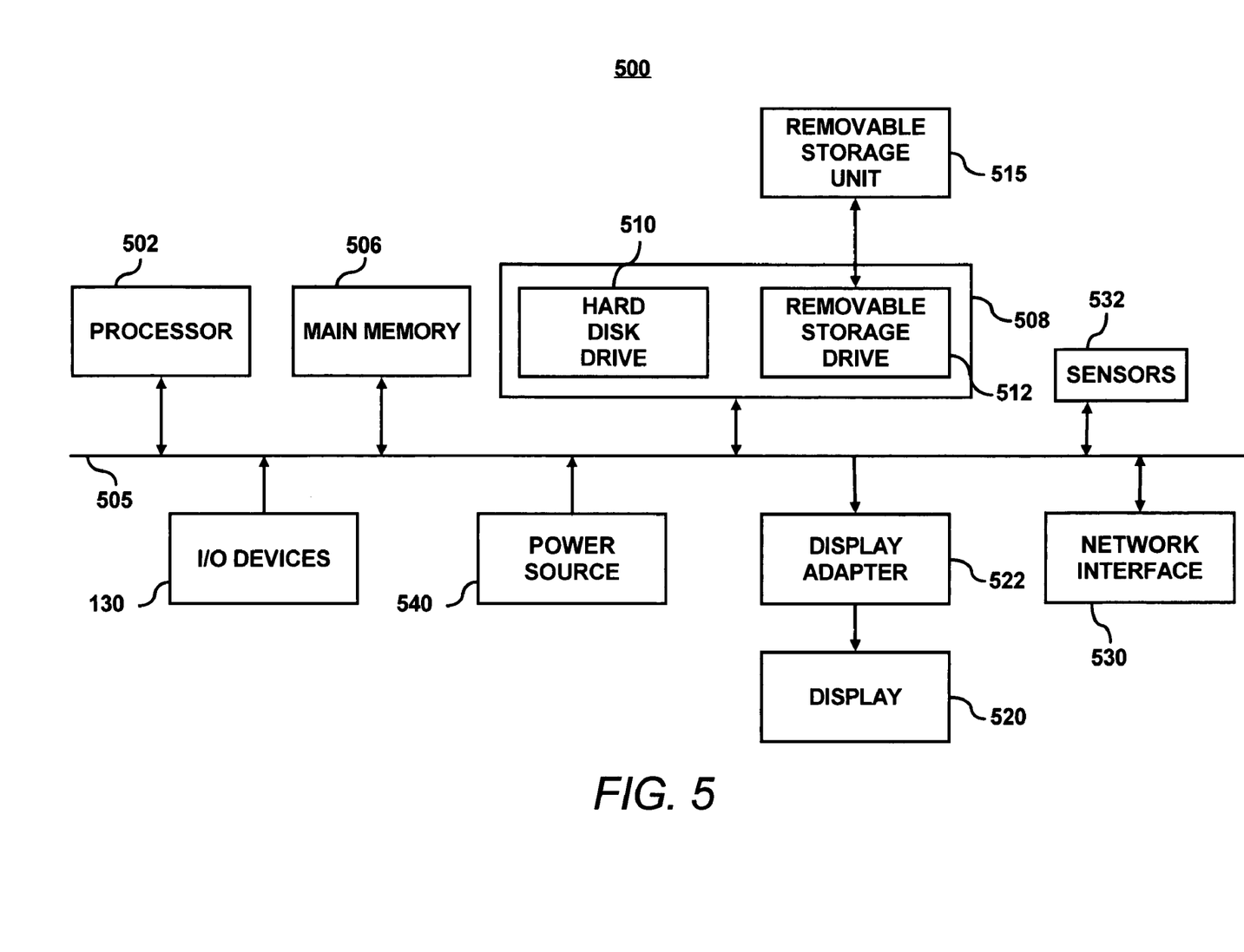
FIG. 5 illustrates a block diagram of a computer system that utilizes the energy-aware control system, according to an embodiment.

FIG. 5 illustrates a block diagram of a computer system 10 that includes the I/O device control system 100 shown in FIG. 1. The computer system 10 includes one or more processors, such as processor 502, providing an execution platform for executing software that may embody one or more components of the I/O device control system 100.

Commands and data from the processor 502 are communicated over a communication bus 505. The computer system 10 also includes a main memory 506, such as a random access memory (RAM), where software may be executed during runtime, and a secondary memory 508. The secondary memory 508 includes, for example, a hard disk drive 510 and/or a removable storage drive 512, representing a SIM or memory card, a floppy diskette drive, a magnetic tape drive, a compact disk drive, etc., or a nonvolatile memory where a copy of the software may be stored. The secondary memory 508 may also include ROM (read only memory), EPROM (erasable, programmable ROM), and/or EEPROM (electrically erasable, programmable ROM). The removable storage drive 512 reads from and/or writes to a removable storage unit 515 in a well-known manner.

A user interfaces with the computer system 500 with one or more I/O devices 130, such as a keyboard, a mouse, a stylus, speech or hand-writing recognition interfaces, display, etc. The display adaptor 522 interfaces with the communication bus 505 and the display 520 and receives display data from the processor 502 and converts the display data into display commands for the display 520. A network interface 530 is provided for communicating with other computer systems via a network (not shown). Also, sensors 532 are provided for measuring power, such as the power meter 112 shown in FIG. 1, and usage of the I/O devices, such as the usage meter 116 shown in FIG. 1. The sensors 532 may be embodied in software, hardware or a combination thereof.

The computer system 500 also includes a power source 540, which may include a battery and/or a tethered connection to an AC power source. The processor 502 is operable to determine a power consumption metric for each of a plurality of I/O devices 130 connected to the computer system 500, select at least one of the plurality of I/O devices 130 based on the determined power consumption metric, and control a selected I/O device to reduce power consumption in response to remaining battery life falling below a threshold.

One or more of the steps of the methods 300 and 400 may be implemented as software embedded on a computer readable medium, such as the memory 506 and/or 508, and executed on the computer system 500. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of selecting input/output (I/O) devices to control power consumption of a computer system, the method comprising:

determining a power consumption metric for each of a plurality of I/O devices connected to the computer system while the plurality of I/O devices are connected to the computer system, wherein the plurality of I/O devices are user interfaces for the computer system and are configured to be used by a user to input information to the computer system or to output information from the computer system to the user;

identifying top power consuming I/O devices of the plurality of I/O devices based on the power consumption metric; and identifying low-power I/O device alternatives to using the top power consuming I/O devices.

2. The method of claim 1, wherein identifying top power consuming I/O devices of the plurality of I/O devices comprises:

estimating future power consumption for each of the plurality of I/O devices for a period of time in the future; and selecting a group of the plurality of I/O devices having the highest estimated future power consumptions.

3. The method of claim 1, wherein the low-power alternatives comprise at least one of placing a top power consuming I/O device in a low-power mode and disabling a top power consuming I/O device if an I/O device providing substantially the same functionality and consuming less power is available for use.

4. The method of claim 1, wherein identifying low-power I/O device alternatives comprises:

using a usage modal to determine whether any low-power I/O device alternatives to using the top power consuming I/O devices are available, the usage model including a historical analysis of usage for the plurality of I/O devices.

5. The method of claim 4, wherein the usage model identifies user acceptance of the low-power I/O device alternatives.

6. The method of claim 1, further comprising:

determining power savings for each of the low-power I/O device alternatives.

7. The method or claim 6, wherein determining power savings comprises:

estimating a first future power consumption for a top power consuming I/O device operating in a normal made;

estimating a second future power consumption for a respective low-power I/O device alternative; and determining a difference between the first and second future power consumptions.

8. The method of claim 6, wherein selecting at least one of the plurality of I/O devices based on the determined power consumption metric comprises:

selecting at least one of the top power consuming devices based on user acceptance and power savings of a low-power I/O device alternative to the at least one top power consuming I/O device.

9. The method of claim 8, wherein selecting at least one of the top power consuming devices comprises:

selecting a plurality of the low-power I/O device alternatives associated with the top power consuming I/O devices;

ranking the plurality of low-power I/O device alternatives based user acceptance and power savings for each of the plurality of low-power I/O device alternatives; and selecting at least one of the plurality of low-power I/O device alternatives based on the ranking.

10. The method of claim 1, further comprising:

selecting at least one of the plurality of I/O devices based on the determined power consumption metric and based on a usage metric for each of the plurality of I/O devices.

11. The method of claim 10, wherein the power consumption metric comprises at least one of estimated power consumption of the plurality of I/O devices, estimated future power consumption of the plurality of I/O devices, an aggregate of the power consumption of each of the I/O devices, power consumption of the computer system, estimated future power consumption of the computer system, and a power savings for each of the I/O devices if a respective I/O device were placed in a low-power mode.

12. The method of claim 10, wherein the usage metric comprises a metric associated with user acceptance of placing an I/O device of the plurality of I/O devices in a low-power mode.

13. The method of claim 1, wherein the power consumption metric comprises at least one of estimated power consumption of the plurality of I/O devices, estimated future power consumption of the plurality of I/O devices, an aggregate of the power consumption of each of the I/O devices, power consumption of the computer system, estimated future power consumption of the computer system, and a power savings for each of the I/O devices if a respective I/O device were placed in a low-power mode.

14. The method of claim 1, wherein each of the I/O devices comprise a piece of hardware, operable to be used in combination with software, providing data to the computer system and/or for receiving data from the computer system.

15. The method of claim 14, wherein the I/O devices comprise at least one of a keyboard, a joystick, a mouse, a touch pad and a display.

16. A method of selecting input/output (I/O) devices to control power consumption of a computer system, the method comprising:

determining a power consumption metric for each of a plurality of I/O devices connected to the computer system while the plurality of I/O devices are connected to the computer system, wherein the plurality of I/O devices are user interfaces for the computer system and are configured to be used by a user to input information to the computer system or to output information from the computer system to the user, wherein the power metric comprises an estimated future power consumption and determining a power consumption metric further comprises determining recent use of each of the plurality of I/O devices; and estimating future power consumption based on the recent use for each of the plurality of I/O devices; and selecting at least one of the plurality of I/O devices based on the estimated future power consumption; and reducing power consumption of the at least one selected I/O device.

17. A method of selecting input/output (I/O) devices to control power consumption of a computer system, the method comprising:

determining a power consumption metric for each of a plurality of I/O devices connected to the computer system while the plurality of I/O devices are connected to the computer system, wherein the plurality of I/O devices are user interfaces for the computer system and are configured to be used by a user to input information to the computer system or to output information from the computer system to the user;

selecting at least one of the plurality of I/O devices based on the determined power consumption metric;

identifying a setting associated with the at least one of the plurality of devices, wherein the setting specifies a constraint on reducing power consumption for the at least one of the plurality of I/O devices; and reducing power consumption of the at least one of the plurality of I/O devices if the constraint specified in the setting can be maintained.

18. The method of claim 17, wherein the setting comprises a setting specified by a user.

19. A method of selecting input/output (I/O) devices to control power consumption of a computer system, the method comprising:
   determining a power consumption metric for each of a plurality of I/O devices connected to the computer system while the plurality of I/O devices are connected to the computer system, wherein the plurality of I/O devices are user interfaces for the computer system and are configured to be used by a user to input information to the computer system or to output information from the computer system to the user, wherein the power consumption metric comprises usage of each of the plurality of I/O devices and is determined by profiling usage of each of the plurality of I/O devices;
   generating a usage model from the profiling;
   selecting at least one of the plurality of I/O devices based on the usage model; and
   reducing power consumption of the at least one selected I/O device.

20. The method of claim 19, wherein profiling usage comprises:
   analyzing recent usage behavior of at least one of the plurality of I/O devices for a given user.

21. The method of claim 19, wherein profiling usage comprises:
   analyzing past usage behavior of at least one of the plurality of devices for a plurality of users.

22. The method of selecting input/output (I/O) devices to control power consumption of a computer system, the method comprising:
   determining a power consumption metric for each of a plurality of I/O devices connected to the computer system while the plurality of I/O devices are connected to the computer system, wherein the plurality of I/O devices are user interfaces for the computer system and are configured to be used by a user to input information to the computer system or to output information from the computer system to the user, wherein the power consumption metric comprises power consumption of each of the plurality of I/O devices and is determined by profiling power consumption of each of the I/O devices;
   generating a power model from the profiting;
   selecting at least one of the plurality of I/O devices based an the power model; and
   reducing power consumption of the at least one selected I/O device.

23. A method of controlling power consumption of I/O devices for a computer system, the method comprising:
   profiling usage patterns of the I/O devices to establish a usage model, wherein the I/O devices are user interfaces for the computer system and are configured to be used by a user to input information to the computer system or to output information from the computer system to the user;
   identifying low-power alternatives to using at least one of the I/O devices using the usage model;
   profiling power consumption of the I/O devices to establish a power model;
   selecting at least one of the low-power alternatives to reduce power consumption of the computer system based on the power model.

24. The method of claim 23, wherein the low-power alternatives comprise at least one of placing an I/O device in a low-power mode and disabling an I/O device if another I/O device providing substantially the same functionality and consuming less power can be used.

25. The method of claim 23, further comprising:
   determining whether a power consumption of the computer system or an estimated future power consumption of the computer system exceeds a threshold; and
   performing the step of identifying low-power alternatives and the step of selecting at least one of the low-power alternatives in response to the threshold being exceeded.

26. An apparatus comprising:
   means for identifying a plurality of low-power alternative means to using an I/O device connected to a computer system using a usage model;
   means for selecting at least one of the low-power alternatives means to reduce power consumption of the computer system using a power model;
   means for determining whether a power consumption of the computer system or an estimated future power consumption of the computer system exceeds a threshold; and
   means for activating the means for identifying a plurality of low-power alternative means and the means for selecting at least one of the low-power alternatives means in response to the threshold being exceeded.

27. The apparatus of claim 26, wherein the low-power alternative means comprises means for providing substantially the same functionality of the I/O device at reduced power consumption.

28. Computer software embedded on a computer readable storage medium, the computer software comprising instructions of:
   determining a power consumption metric for each of a plurality of I/O devices connected to a computer system, while the plurality of I/O devices are connected to the computer system, wherein the plurality of I/O devices are user interfaces for the computer system and are configured to be used by a user to input information to the computer system or to output information from the computer system to the user;
   identifying top power consuming I/O devices of the plurality of I/O devices based on the power consumption metric; and
   identifying low-power I/O device alternatives to using the top power consuming I/O devices.

29. The computer software of claim 28, wherein the instruction of selecting at least one of the plurality of I/O devices comprises instructions of:
   identifying top power consuming I/O devices of the plurality of I/O devices based on the power consumption metric; and
   selecting at least one of the top power consuming I/O devices to reduce power consumption.

30. The computer software of claim 29, further comprising an instruction of:
   determining whether any low-power I/O device alternatives to using the top power consuming I/O devices are available.

31. The computer software of claim 30, further comprising an instruction of: determining power savings for each of the low-power I/O device alternatives.

32. The computer software of claim 31, wherein the instruction of selecting at least one of die plurality of I/O devices comprises an instruction of:

selecting at least one of the top power consuming devices based on user acceptance and power savings of a low-power I/O device alternative to the at least one top power consuming I/O device.

33. A computer system comprising:
a processor; and
a battery, wherein the processor is operable to determine a power consumption metric for each of a plurality of I/O devices connected to the computer system, select at least one of the plurality of I/O devices based on the determined power consumption metric, and control the at least one selected I/O device to reduce power consumption in response to remaining battery life falling below a threshold,
wherein usage is profiled for each of the plurality of I/O devices and a usage model is generated from the profiling and the processor selects the at least one of the plurality of I/O devices based on the usage model.

* * * * *

UNITED STATES PATENT AND TRADEMARK OFFICE
CERTIFICATE OF CORRECTION

| | | |
|---|---|---|
| PATENT NO. | : 7,366,921 B2 | Page 1 of 1 |
| APPLICATION NO. | : 10/830217 | |
| DATED | : April 29, 2008 | |
| INVENTOR(S) | : Parthasarathy Ranganathan | |

It is certified that error appears in the above-identified patent and that said Letters Patent is hereby corrected as shown below:

In column 4, line 40, delete "1112" and insert -- 112 --, therefor.

In column 13, line 22, in Claim 4, delete "modal" and insert -- model --, therefor.

In column 13, line 33, in Claim 7, delete "or" and insert -- of --, therefor.

In column 13, line 37, in Claim 7, delete "made" and insert -- mode --, therefor.

In column 15, line 33, in Claim 22, delete "The" and insert -- A --, therefor.

In column 15, line 48, in Claim 22, delete "profiting" and insert -- profiling --, therefor.

In column 15, line 50, in Claim 22, delete "an" and insert -- on --, therefor.

In column 16, line 66, in Claim 32, delete "die" and insert -- the --, therefor.

Signed and Sealed this

Twenty-third Day of June, 2009

JOHN DOLL
*Acting Director of the United States Patent and Trademark Office*